United States Patent [19]

Engels

[11] 3,854,689
[45] Dec. 17, 1974

[54] LOAD-BEARING HOOK
[76] Inventor: Hans Michael Engels, 15, Lerchenweg, Hofheim, Germany 6238
[22] Filed: July 24, 1972
[21] Appl. No.: 274,359

[30] Foreign Application Priority Data
Aug. 3, 1971 Germany...................... 7129741[U]
Dec. 2, 1971 Germany........................... 2159730

[52] U.S. Cl................................. 248/340, 17/44.2
[51] Int. Cl............................................ A22c 15/00
[58] Field of Search ........... 248/339, 340, 341, 215; 17/44.2

[56] References Cited
UNITED STATES PATENTS
| | | | |
|---|---|---|---|
| 697,197 | 4/1902 | Clark | 248/340 |
| 911,079 | 2/1902 | Smith | 248/339 |
| 1,364,177 | 1/1921 | Booth | 248/341 |
| 3,488,025 | 1/1970 | Rowland | 248/339 |
| 3,612,459 | 10/1971 | Walls | 248/215 |

FOREIGN PATENTS OR APPLICATIONS
| | | | |
|---|---|---|---|
| 653,589 | 12/1962 | Canada | 248/340 |
| 1,265,989 | 5/1961 | France | 248/339 |
| 1,030,536 | 5/1958 | Germany | 248/340 |

Primary Examiner—Roy D. Frazier
Assistant Examiner—Thomas J. Holko
Attorney, Agent, or Firm—Omri M. Behr

[57] ABSTRACT

There is provided a novel form of load bearing hook, such as a butcher's hook, of high strength, light weight and corrosion resistance. In particular there are provided butchers' hooks of heavy duty corrosion resistance plastic which have substantially planar load bearing and suspending surfaces and possess a stiffening rib integral therewith lying in a plane substantially perpendicular to said surfaces.

6 Claims, 6 Drawing Figures

PATENTED DEC 17 1974　　　　　　　　　　　3,854,689

LOAD-BEARING HOOK

FIELD OF THE INVENTION

Novel load bearing hooks.

DESCRIPTION OF THE PRIOR ART

Load-bearing hooks and more particularly butchers' hooks comprise a top part for suspension and a bottom part for load attachment. Such hooks such as tube-rail sliding hooks, are hung from a tubular support or tube-rail and carry a load such as killed beef or pork, for example, on the bottom hook.

Butchers' hooks of that type, as used in all meat handling concerns, such as slaughterhouses, meat packing stations and butchers' shops, for instance, have hitherto been made from steel in various sizes and with varying load-bearing capacities. The hooks have a top suspension part, which is generally out of contact with the load and is suitably shaped for hanging over the supporting tube; this upper part is mostly galvanized by the hot-dip process. Joined to the top part by welding is a bottom hook made of galvanized iron, stainless steel or aluminum. The top and bottom parts must be protected against corrosion.

These hooks are heavy and expensive, because the hot-dip and other galvanizing, the welding and the grinding and polishing of stainless steel entail heavy labor costs.

It is desirable to provide a hook which is simple to make, will support heavy loads and can easily be cleaned and the surface of which is compatible with the nature of the goods supported and complies with food acts and other regulations.

SUMMARY OF THE INVENTION

The load-bearing hook of the present invention comprises top and bottom parts made in one piece from a heavy-duty plastic, which will not corrode when in contact with meat.

The plastics used and the hook dimensions should preferably be such that the hook can support up to 500 kg. in temperatures ranging between −50°C and +80°C. This will give a hook measuring about 30 to 40 cm. over all, which is easy to handle and which, moreover, can be produced in one piece by transfer moulding, so that it is free from weld seams. The simplicity of transfer moulding in one piece reduces the cost price to about one-third of what it has been hitherto. In addition, such a hook is lighter than those used up to now. Hence, not only is it easier to handle, but advantages also accrue in the matter of transport, especially when they are carried in large quantities, as well as in regard to the dimensioning of supporting tubes or tube-rails when these are being installed. The hook is smooth-faced, on account of which and because of the use of plastics it can be hygienically cleansed. If desired, too, it can be made in various colors. The point of the bottom hook can also be made such that it readily penetrates the load, that is to say the carcase, for example. Again, because of the well rounded edges readily associated with the use of plastics, and owing to the lightness of the hook, it can be handled with far less risk of accidents. In view of these favorable properties, moreover, one size or two sizes at most will generally suffice, whereas it has hitherto been necessary to keep four or five different sizes in stock, according to the variation in permissible loads.

DESCRIPTION OF THE PREFERRED EMBODIMENTS

As stated heretofore the novel hooks of the present invention comprise a single molded piece of plastic, however for convenience of description only and not for the purpose of designating separate parts thereof reference will be had to arcuate top and bottom parts and portions and connecting parts and portions of the hooks of the present invention.

Figure 1:
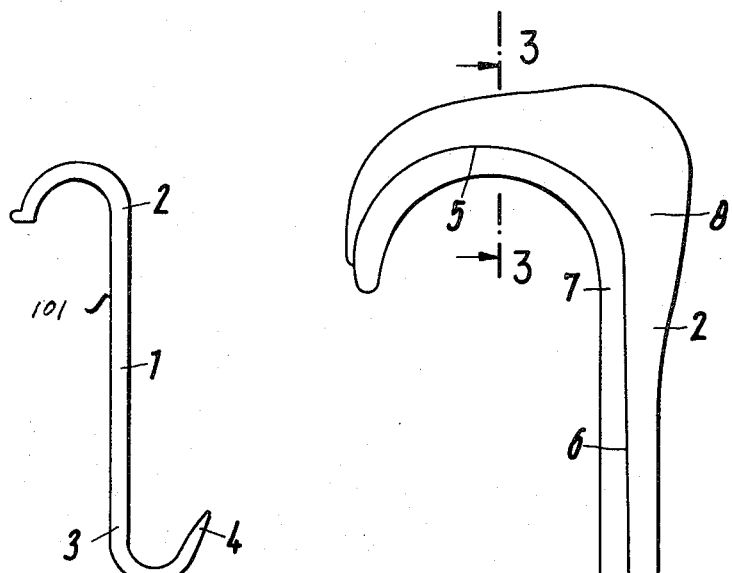
FIG. 1 shows one type of load-bearing hook, which is of circular cross section.
Figure 3:
FIG. 3 is a section along the line 3—3 in FIG. 2.

The load-bearing hook 101 shown in FIG. 1 is circular in cross section. It comprises an arcuate top portion 2, bent to form a semi-circle, open in a substantially downward direction, the radius of curvature being such that the hook fits onto the usual tube-rail. Made in one piece with this top portion 2 and connected thereto by connecting portion 1 is an arcuate bottom portion 3, the end of which is bent the opposite way to the top portion and open in a substantially upward direction which terminated in a point, 4, shaped for ready penetration of the load this is to be suspended.

For particular applications of the hook shown in FIG. 1, it may be desirable for that part of the hook which rests on the tube-rail to be faced with special abrasion-resistant plastics or with metal.

Those parts of the hook which are subjected to particularly heavy tensile or bending stresses may also be made correspondingly larger in cross section.

Figure 2:
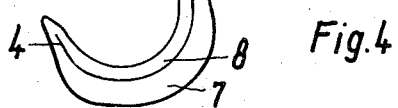
FIG. 2 shows another form of load-bearing hook, of T-shaped cross section.

FIG. 2 shows another form 102 of the load-bearing hook of the present invention. The only essential difference between hooks 101 and 102 lies in the cross section. Both the top portion 2 and the bottom portion 3 in FIG. 2 and substantially T-shaped in section throughout practically their entire length, as instanced by the section along the line 3—3.

In the hook 102, the end of the top portion 2 is arcuate, suitably to form a semi-circle. This portion thus comprises a substantially semi-circular part, 5, and a straight part, 6, further comprising a flange, 7, and an upper longitudinal stiffening rib, 8, set perpendicular thereto. The flange 7 is provided at the inner periphery of the semi-circular part 5 of the top portion 2. Attached to one end of top part is connecting portion 1 comprising an upper part 6 and a lower part 10, parts 6 and 10 suitably being substantially straight. Connecting portion 1 further comprises a flange portion which is a continuation of the flange portion of part 5 and a rib portion which is a continuation of rib 8 on part 5. Starting from the free end of the semi-circular part 5, the depth of the stiffening rib 8 measured perpendicularly to flange 7 graudally increases, attaining its maximum just before the point at which the semi-circular part 5 runs into the straight part 6, that is to say, where the effective radius of curvature of part 5 increases of connecting portion 1, whence it decreases along the straight part 6 to a constant depth over the latter.

The bottom portion of the load-bearing hook 102 is also bent similarly to the bottom portion of the hook 101. The bottom portion 3 thus comprises an arcuate bottom part, 9, and a straight part, 10. Here again, the arcuate part, 9, comprises a flange, 7, and a stiffening rib, 8, set perpendicular to said flange. The flange 7 is again situated on the inner periphery of the arcuate, suitably semi-circular part 9 of the bottom portion 3 and on the same side of the straight part 10, being joined in the middle of connecting portion 1 to the flange on upper portion 6 of member 1. The stiffening rib 8 runs around the outer periphery of the arc-shaped end and along the adjacent straight part 10 of the bottom portion. From the tip of the arcuate part 9, likewise, the depth of the stiffening rib 8 increases rapidly; it then remains constant round the outer periphery of the arcuate part 9 and gradually reduces, in the straight part 10 of the bottom portion, to a constant depth from the flange.

At the point where the top portion 2 meets the bottom portion 3, the flange 7 passes over from one side of the hook on the top portion 2 to the other side on the bottom portion 3. The stiffening ribs 8 on the top portion 2 and bottom portion 3 tapering off on their respective sides of portion 1 at the cross over point.

The load-bearing hook 102 is particularly suitable for supporting heavy loads, in that the flange 7 provides both the top and the bottom portion with large load-bearing faces, so that the pressure per unit surface area can be kept relatively low. The construction as a whole, with its stiffening ribs, also contributes to the ability of such a hook to be used for loads which are heavy in relation to its dimensions. A particularly favorable point in this connection is that the flange, in passing from the top to the bottom portion, is carried from one side of the hook to the other without any reduction in cross section. This ensures satisfactory transmission of forces from the bottom portion 3 to the top portion 2. The load-bearing hook 102 also possesses the necessary rigidity to enable it to be driven straight into the load that is to be suspended.

Figure 4:
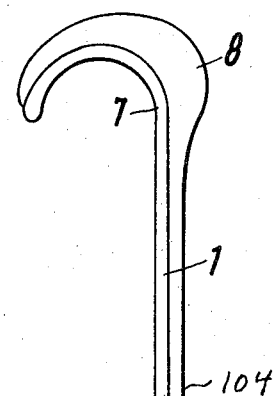
FIG. 4 shows a modified form of load-bearing hook, in which the bottom portion is bent toward the same side as the top portion.

FIG. 4 shows a further embodiment 104 of the invention, wherein both its arc-shaped ends having their centers of curvature on the same side of connecting member 1. This hook, 104, too, is preferably composed of a flange from which runs a stiffening rib. The cross section should preferably be T-shaped over the entire length of the hook. The flange, which lies inside the top arcuate part continues along the same side of the straight connection portion of the hook to the flange inside the arcuate bottom part. Similarly, the stiffening rib is provided on the outside of the two arcuate parts and along the same side of the intermediate connecting part.

In another practical form of the invention, the load-bearing hook may also be designed as a double hook, still with a top portion for suspension from the supporting tube, but with a second bottom portion extending to one side of the first. This hook likewise is so constructed, and in particular is provided with stiffening ribs in such a way that it can support a total load of about 500 kg.

Figure 5:
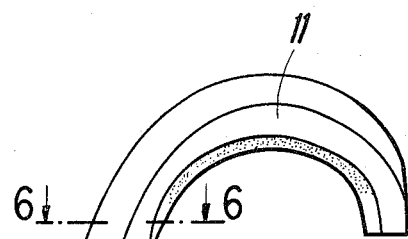
FIG. 5 shows one type of a multi-hook with T-shaped cross section at those parts that are subject to large bending stresses.
Figure 5:
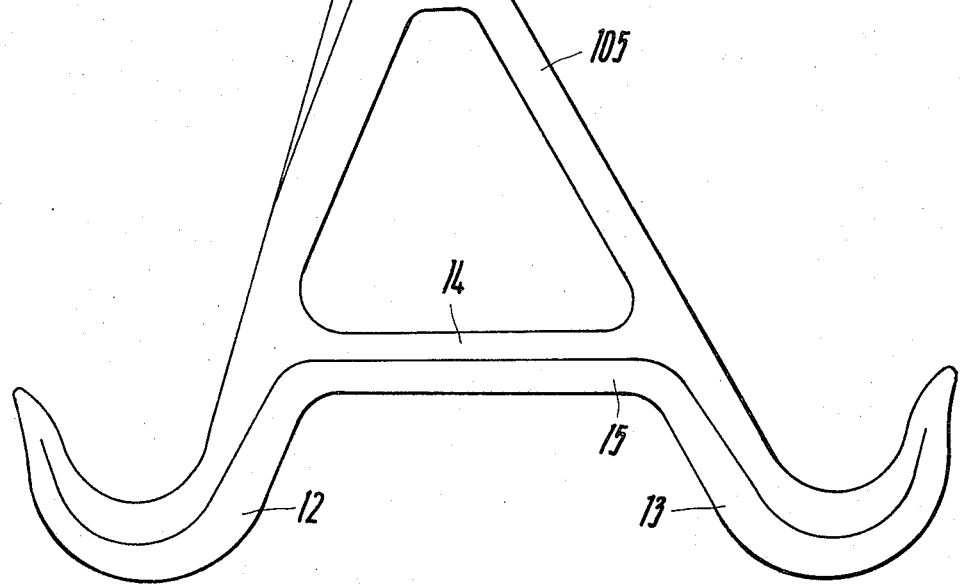
Figure 6:
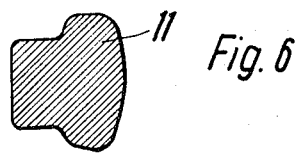
FIG. 6 shows a section along the line 6—6 in FIG. 5.

FIG. 5 shows a double hook 105 with a top portion 11 and with two bottom portions 12 and 13. The bottom portions 12 and 13 each of which is constructed similarly as the bottom portion 3 of the hook 102 of FIG. 2 are connected by a connecting portion 14 provided with a rib 15 so that it is of T-shape. The inner surface of the top portion 11 is not flat but vaulted to the outside so that the hook touches a supporting tube only with a narrow line. The vaulted inner surface of the top portion 11 can be better seen from FIG. 6 which is a section along the line 6—6 in FIG. 5.

The point or points of the proposed hook may be hardened or specially smoothed.

The hook can naturally not only serve for hanging meat, but such hooks can also be used for other loads such as sacks, for example, provided the load does not exceed the prescribed limit.

The cross section of the hook may also differ from the examples illustrated here, but it will always be desirable, according to circumstances, for those parts of the hook which are subjected to special stress to be suitably strengthened or enlarged in cross section.

The novel hooks of the present invention are manufactured by transfer moulding, a procedure well known in the art using high strength polymers such as polyoxymethylene co-polymers of polyoxymethylene terpolymers that are abrasion-proof and self-greasing. It is recognized of course that a co- or ter-polymer is, strictly speaking a polymer resulting from the co-polymerization of two or three monomers respectively, however, the designation of the other components as polymers is simpler and well understood by those skilled in the art.

The polymers useful in the present invention have a tensile strength of 650 Kg./cm$^2$, suitably due to the bending stresses from about 330 to about 400 Kg./cm$^2$ at ambient temperatures. These polymers, however, will maintain a tensile strength within the above permissive ranges over a temperature range of from about −50°C to +80°C. They possess a molecular weight of about 80,000.

Among the polymers found particularly useful in the manufacture of the novel hooks of the present invention are those designated as Hostaform Type C 9020 and Hostaform Type C2520 L (manufactured by Farbwerke Hoechst AG, 6230 Frankfurt am Main-Hoechst). The Hostaform Type C 2520 L has a tensile strength of 670 Kg./cm$^2$ and a density range from about 1.41 to about 1.44 at 20°C. The softening point is at 154°C in air.

Where especial abrasion resistance is required at the lower load-bearing surface of the upper arcuate part, said surface may be coated with an abrasion resistant plastic such as highly crystallined acetal co-polymer. See, for instance, the underside of the top portion 11 of double hook 105 in FIG. 6.

These coatings may be adhered to said surface by the use of staples, clamps, adhesives or other affixing means well known in the art.

I claim:

1. A unitary load-bearing hook having an S-shape configuration which lies in a single plane when viewed from the side, said hook comprising:
   an arcuate top part including a lower flange portion having a lower surface, said lower surface corresponding to a segment of the outer surface of a cylinder and further including an upper longitudinal stiffening rib positioned perpendicularly to said flange portion, the said lower surface of said flange portion being the load-bearing surface of said top part;

an arcuate bottom part being substantially pointed at one end thereof and including an upper flange portion having an upper surface, said upper surface corresponding to a segment of the surface of a cylinder, and further including a lower longitudinal stiffening rib positioned perpendicularly to said flange portion, said upper surface being the load-bearing surface of said lower part;

a connecting portion between the top part and the bottom part comprising a flange portion and a longitudinal stiffening rib portion said flange portion of said connecting portion passing across said connecting portion whereby the flange on said upper portion of the connecting portion adjacent to the arcuate top part lies on one side of the hook and comprises a continuation of the downward facing surface of said top part while the remaining portion of said flange on the lower portion of the connecting portion adjacent to the bottom arcuate part lies on the other side of the hook and comprises a continuation of the upward facing surface of said bottom part; and the thickness of the stiffening rib measured perpendicularly to the load-bearing surface of the top part increases from the free end of the top part to a maximum value substantially at a point just before the radius of curvature of said top part increases at its point of juncture with said connecting portion, thereafter the total thickness of the rib along said connecting portion decreases to a constant value relative to the thickness of the flange along the major section of said connecting portion increasing again to its maximum value at the lower sector of the hook substantially at a point just after the radius of curvature of said bottom part decreases to its substantially constant value decreasing again to reach its minimum at the free, pointed end of the bottom arcuate part, wherein said hook is constructed of heavy duty load-bearing plastic which is resistant to corrosion when in contact with meat.

2. A hook according to claim 1 wherein the plastic utilized possesses the following characteristics:

a tensile strength of about 650 Kg./cm$^2$; a molecular weight of about 80,000; and preferably a density range from about 1.41 to about 1.44 at 20°C; a melting index of about 2.5 g/10 min; and a softening point in air of about 154°C.

3. A hook according to claim 2 wherein the plastic utilized is a polyoxymethylen-co-polymer or a polyoxymethylen ter-polymer such as Hostaform Type C 2520 L or Hostaform Type C 9020 (manufactured by Farbwerke Hoechst AG, Frankfurt am Main-Hoechst.)

4. A hook according to claim 1 further comprising an abrasion resistant coating attached to said predetermined downwardly facing lower surface of said arcuate top part.

5. A hook according to claim 1 wherein the free pointed end of the bottom arcuate part is hardened and smoothed.

6. A unitary load-bearing hook, comprising:

a downward curving arcuate top portion having a vaulted load-bearing inner surface;

a triangular center section having three apexes, said arcuate top portion being connected to one of said apexes, the other two apexes being joined by a connecting portion;

a pair of pointed, upward curving arcuate bottom portions attached respectively to each of the two remaining apexes of said triangular center section, the pointed ends of each of said bottom portions facing away from each other, said top portion, triangular center section and said pair of bottom portions all being connected together by a continuous rigid member which forms the load-bearing surfaces of said top and bottom portions;

a continuous stiffening rib located at the bottom of said hook and extending between said pair of pointed, upward curving, arcuate bottom portions and across said connecting portions, said stiffening rib being positioned perpendicularly to said connecting portion and forming a T-shaped cross section with respect thereto, said stiffening rib further having a minimum thickness at the pointed ends of said bottom portions and increasing to a maximum thickness near the center of said bottom portion, said stiffening rib thereafter continuing to a constant value as it traverses said connecting portion;

wherein said hook is constructed of a continuous rigid plastic material that is resistant to corrosion when in contact with meat.

* * * * *